United States Patent
Link et al.

(10) Patent No.: US 8,238,534 B2
(45) Date of Patent: *Aug. 7, 2012

(54) CREDIT CARD COLLECT CALL SYSTEM AND METHOD

(75) Inventors: Michael P. Link, Wheaton, IL (US); Kenneth A. Skupien, Chicago, IL (US); Pepper Mulherin, Evansville, IN (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1428 days.

This patent is subject to a terminal disclaimer.

(21) Appl. No.: 11/317,128

(22) Filed: Dec. 23, 2005

(65) Prior Publication Data

US 2006/0171517 A1 Aug. 3, 2006

Related U.S. Application Data

(63) Continuation of application No. 10/708,611, filed on Mar. 15, 2004, now Pat. No. 7,013,002.

(51) Int. Cl.
*H04M 17/00* (2006.01)
*H04M 15/00* (2006.01)
(52) U.S. Cl. .......... 379/144.02; 379/114.19; 379/114.21
(58) Field of Classification Search ............. 379/114.01, 379/114.15, 114.19, 114.2, 114.21, 114.23, 379/114.25, 127.04, 127.05, 144.02
See application file for complete search history.

(56) References Cited

U.S. PATENT DOCUMENTS

| | | | |
|---|---|---|---|
| 5,353,335 A * | 10/1994 | D'Urso et al. | 379/114.2 |
| 5,619,556 A | 4/1997 | Richardson, Jr. et al. | |
| 5,859,900 A | 1/1999 | Bauer et al. | |
| 5,875,236 A | 2/1999 | Jankowitz et al. | |
| 5,898,771 A | 4/1999 | Florindi et al. | |
| 6,330,315 B1 | 12/2001 | Kapsales et al. | |
| 6,430,274 B1 * | 8/2002 | Winstead et al. | 379/114.14 |
| 6,639,977 B1 * | 10/2003 | Swope et al. | 379/114.21 |
| 6,836,540 B2 * | 12/2004 | Falcone et al. | 379/127.02 |
| 7,013,002 B2 * | 3/2006 | Link et al. | 379/144.02 |
| 2002/0103899 A1 | 8/2002 | Hogan et al. | |
| 2003/0086546 A1 | 5/2003 | Falcone et al. | |
| 2003/0198325 A1 | 10/2003 | Bayne | |

FOREIGN PATENT DOCUMENTS

WO    WO 98/34393    8/1998

* cited by examiner

*Primary Examiner* — Quoc D Tran
(74) *Attorney, Agent, or Firm* — Toler Law Group, LC

(57) ABSTRACT

A system is provided for connecting collect calls. A collect call number for the collect call is received. A blocking status of the collect call number is determined. The collect call number is dialed. A call recipient is prompted to accept the collect call and to select a billing option according to the blocking status. The collect call is connected based on the selected billing option.

20 Claims, 2 Drawing Sheets

CREDIT CARD COLLECT CALL SYSTEM AND METHOD

CROSS-REFERENCE TO RELATED APPLICATION(S)

This application is a continuation of and claims priority from U.S. patent application Ser. No. 10/708,611, filed Mar. 15, 2004, and entitled "CREDIT CARD COLLECT CALL SYSTEM AND METHOD," which is incorporated herein by reference in its entirety.

FIELD OF THE DISCLOSURE

The present invention relates generally to systems and methods of providing collect call service.

BACKGROUND

Industry has provided several prepaid and direct billing options for the performance of a collect call. Collect calls may be performed at most locations where phone service is provided. Collect calls may be performed at pay phone, business, and residence locations, as well as within inmate facilities.

In general, collect calls are performed by a party dialing for an operator or a platform, this is sometimes referred to as an "automated operator", and requesting for collect call service to an intended or specified phone number. The calling party typically provides the operator with some personal information, such as the calling party's name. The operator then dials the specified phone number and requests a called or receiving party whether they are willing to accept charges for a collect call from the calling party. When the receiving party accepts the charges, the operator then proceeds to connect and bill the call to the party normally billed and associated with the specified phone number.

The above-stated process can be annoying or troublesome to both the calling party and the receiving party. For example, the calling party may be in a state of emergency and as such may call a specified number to request aid. In so doing, the calling party may determine that the receiving party or party answering the call is unable to and does not have the authority to accept the charges for the collect call or that the service carriers are prohibited from placing a call to the specified or called number. As a result, the calling party may experience an extended delay in aid or may be undesirably without aid.

Traditionally, in order for an inmate to perform a collect call to a receiving party that cannot accept collect calls, the receiving party must pre-setup a valid prepaid account with a service provider. Many local carriers have requested selective blocking of calls from certain locations, such as inmate facilities. The prepaid account is setup and associated with one or more approved called party numbers and aids in assuring that a collect call is paid for in full. Once the prepaid account is setup, the inmate may attempt to call the receiving party and have the cost of the collect call paid using funds within the prepaid account. Collect calls are allowed until such time when the funds in the prepaid account have depleted.

Generally, when a call is blocked, a receiving party is notified of the inability to receive a collect call from an inmate facility. The receiving party may receive the collect call when arrangements are made for other payment options. One such payment option is a prepaid account. The receiving party is instructed to call the service center to setup a pre-paid account to allow the reception of calls from the inmate facility. The receiving party may then call the service center and be instructed as to the process steps to follow to fund a prepaid account. This process is long. The duration of time between when a receiving party is informed of an attempted collect call and when that receiving party is actually able to receive a collect call can be up to 24 hours.

Thus, there exists a need for an improved system and method of providing collect calls in general and especially to inmates within an inmate facility.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION OF THE DRAWINGS

Figure 1:
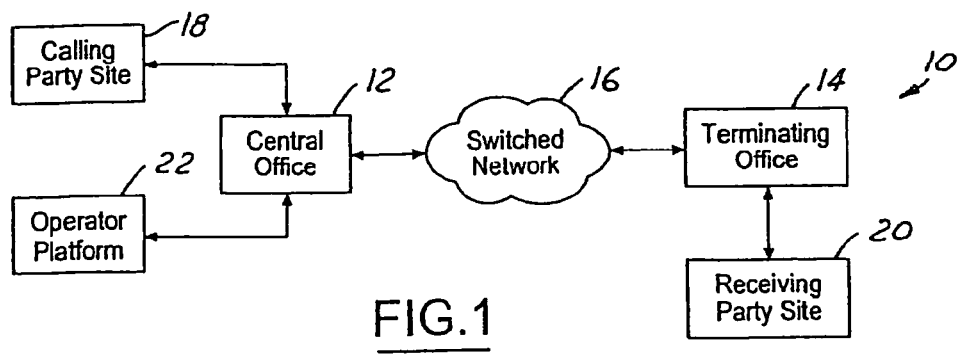
FIG. 1 is a block diagrammatic view of a telecommunication system providing collect call service in accordance with an embodiment of the present invention.

While the present invention is described with respect to a system and method of providing collect call service, the following apparatus is capable of being adapted for various purposes and applied in various applications.

In one embodiment, a method is provided. A caller-specified phone number is dialed to initiate a telephone call. A receiving party is notified that the telephone call is a collect call. Billing options according to a blocking status of the caller-specified phone number are offered for selection by the receiving party to select a desired billing option of the collect call. The collect call is connected between a caller and the receiving party in response to the desired billing option.

In another embodiment, a system of processing a collect call has an input and a processor. The input receives a call and a caller-specified phone number from a caller. The processor determines a blocking status of the caller-specified phone number. The processor transfers control of the collect call to an operator services platform to connect the collect call when the blocking status indicates a non-blocked condition. When the blocking status indicates a blocked condition, the processor dials the caller specified phone number directly, notifies a call recipient that the call is a collect call, and prompts the call recipient for billing information. The processor connects the call according to the billing information.

In another embodiment, a system is provided for connecting collect calls. A collect call number for the collect call is received. A blocking status of the collect call number is determined. The collect call number is dialed. A call recipient is prompted to accept the collect call and to select a billing option according to the blocking status. The collect call is connected based on the selected billing option.

In the following description, various operating parameters and components are described for one constructed embodiment. These specific parameters and components are included as examples and are not meant to be limiting.

Also, in the following description a communication site may refer to any telecommunication site known in the art. A communication site may, for example, refer to a central office, a terminating office, a calling party site, a receiving party site, an operator platform, or a line information database platform (LIDB).

The present invention provides a system and method of providing collect calls. The method includes receiving a request for a collect call from a calling party. A selected number to call is received. A call is placed to a receiving party. Agreeability of the receiving party to accept the credit card billing for the collect call is determined. The calling party is connected to the receiving party in response to the acceptance.

The embodiments of the present invention provide several advantages. One such advantage is the provision of accepting a collect call and approving the credit card billing of that collect call by a receiving party. In so doing, the present invention provides efficient acceptance and billing of a collect call.

Another advantage that is provided by an embodiment of the present invention is the provision of determining whether a collect call number is blocked and offering the receiving party credit card billing in response to that determination. As such, the stated embodiment assures that a call is placed to the receiving party and that the receiving party has the option of accepting the collect call.

The embodiments of the present invention provide other advantages over prior systems and methods of providing collect calls, which will be best understood by reference to the following description, taken in conjunction with the accompanying figures.

Referring now to FIG. 1, a block diagrammatic view of a telecommunication system 10 providing collect call service in accordance with an embodiment of the present invention is shown. The system 10 includes a central office 12 and a terminating office 14. The central office 12 receives collect call requests from a calling party. The central office 12 routes the collect calls through a switched network 16 to the terminating office 14. The switched network 16 may be a public switched telephone network (PSTN). The terminating office 14 may then route the collect calls to intended or receiving parties upon approved billing thereof. The collect calls may be billed to the receiving parties using standard billing methods or may be billed to credit card accounts provided by the receiving parties.

The collect call requests are generated from calling party sites, such as the site 18. The collect calls are received by the receiving parties located at receiving party sites, such as the receiving party site 20. Although only one calling party site and one receiving party site are shown, any number of each may be included in the system 10. The calling party sites 18 and the receiving party sites 20 may be in the form of a business, a residence, a pay phone, a commercial facility, a military facility, an inmate facility, or may be in some other site form known in the art.

The central office 12 and the terminating office 14 may be in the form of a carrier provider, a carrier, a vendor, a competitive local exchange carrier (CLEC), or some other telecommunication service provider. A carrier provider may, for example, be MCI® or VERIZON®. A carrier may, for example, be Southern New England Telephone™. Although the system 10 is shown as having a single central office and a single terminating office, any number of each may be included within the system.

The central office 12 and terminating office 14 may have central processing units that may be microprocessor-based, such as a computer having a central processing unit, memory (RAM and/or ROM), and associated input and output buses. The processing units may be utilized to perform various telecommunication service tasks. The central processing units may be application-specific integrated circuits or be formed of other logic devices known in the art. The central processing units may be in the form of a mainframe, a workstation, or other processing unit known in the art.

The central office 12 is also coupled to an operator platform 22 that provides operator services. The operator platform 22 may perform prompting services to the receiving parties, credit card validation services, billing services, or other operator services known in the art. The operator platform 22 may also be microprocessor based and may be located at several communication sites, such as the central office 12.

The calling party and the receiving party may refer to inanimate or animate objects. In a standard collect call situation a first individual at a first site may call an operator and request a collect call and a second individual at a second site may accept billing for that collect call. There exist several other possible situations, some of which are described below.

A collect call may be requested from and accepted by an inanimate object, such as a phone or dialing service, a computer, a modem, an answering machine or service, or by some other automated machine, system, or service known in the art. For example, an individual may call an operator and request a collect call to a receiving party site. The operator may call the receiving party site and request acceptance for a collect call. The receiving party at the receiving party site may be an answering machine, which receives and verifies the calling party information from the operator. The answering machine may than accept the collect call, provide a credit card number for billing of the collect call, and record a message from the calling party.

Figure 2:
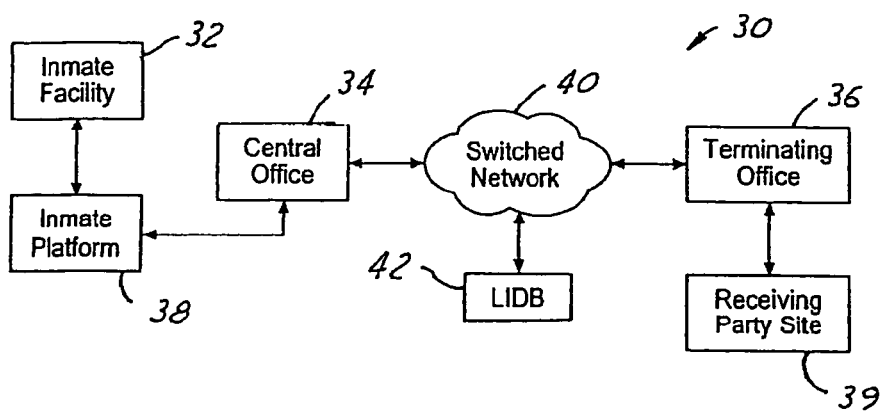
FIG. 2 is a block diagrammatic view of an inmate telecommunication system providing collect call service from an inmate within an inmate facility in accordance with an embodiment of the present invention.

Referring now to FIG. 2, a block diagrammatic view of an inmate telecommunication system 30 providing collect call service from an inmate within an inmate facility 32 in accordance with an embodiment of the present invention is shown. The inmate system 30 includes a central office 34 and a terminating office 36 that are similar to the central office 12 and terminating office 14. The central office 34 is coupled to an inmate platform 38, which is in turn coupled to the inmate facility 32. The inmate facility 32 facilitates, monitors, and processes collect calls from the inmates within the inmate facility 32 to receiving parties at receiving party sites, such as site 39. A network 40, similar to the network 16, is coupled between the central office 34 and the terminating office 36. A line information database platform (LIDB) 42 is coupled to the network 40 and determines the status of the called numbers. Although the LIDB 42 is shown, described, and validated with respect to an inmate scenario, the LIDB 42 may be utilized and validated in non-inmate scenarios.

The inmate platform 38 receives collect call requests from the inmates within the inmate facility 32. The inmate platform 38 determines whether to validate the collect called numbers. The inmate platform 38 may also validate credit card numbers, as well as perform other services known in the art. The inmate platform 38 may also be microprocessor based and be located at various communication sites, such as the inmate facility 32 or the central office 34.

The LIDB 42 performs a query to determine the status of the collect called number and generates a status signal providing information to the inmate facility 32. The LIDB 42 may also be microprocessor based and be located at various communication sites. The LIDB 42 may be located at the central office 34, at the terminating office 36, at the site of the inmate platform 38, or may be located separately, as shown.

Figure 3:
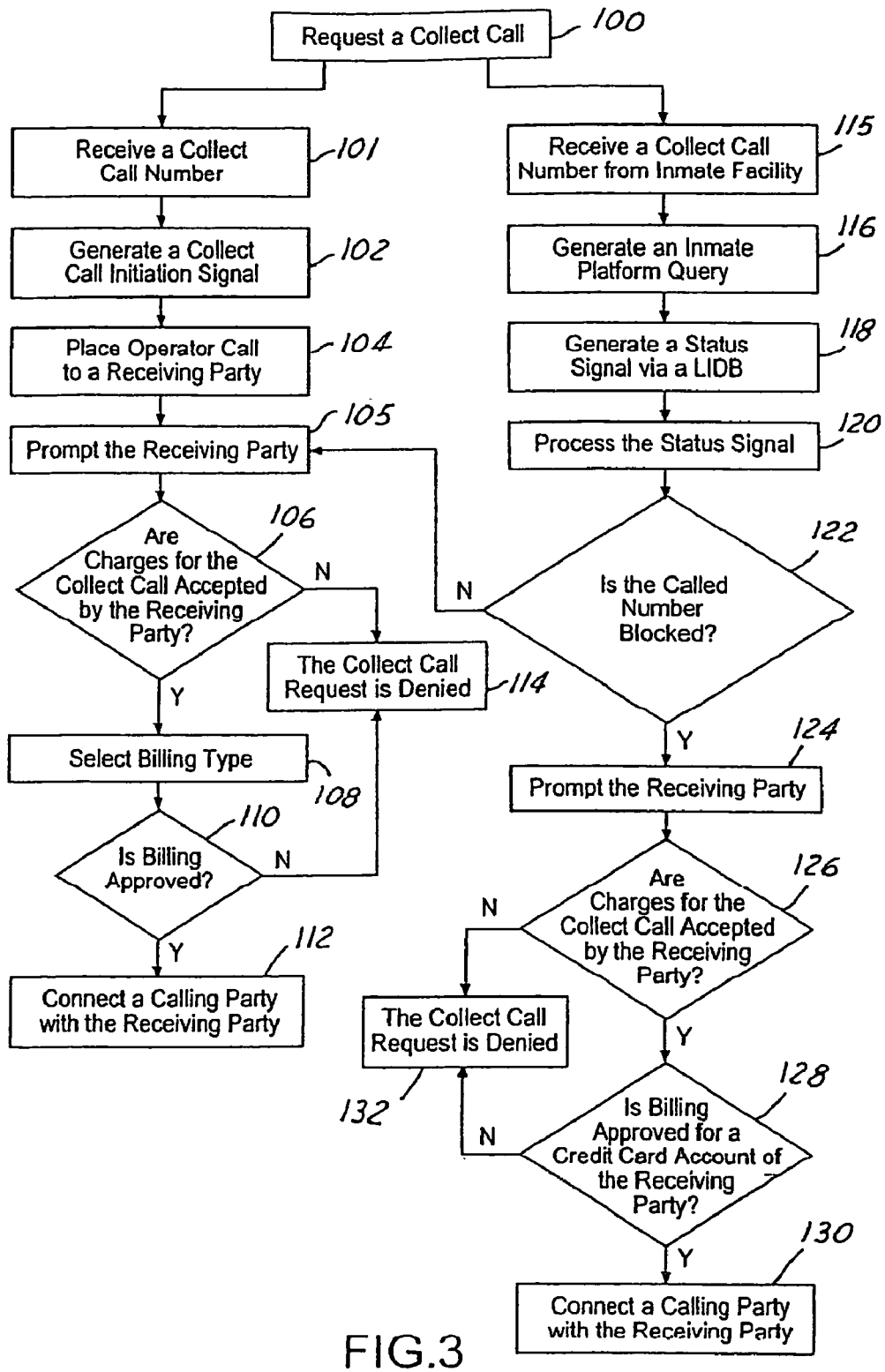
FIG. 3 is a logic flow diagram illustrating a method of providing collect call service in accordance with an embodiment of the present invention.

Referring now to FIG. 3, a logic flow diagram illustrating a method of providing collect call service in accordance with an embodiment of the present invention is shown. In step 100, a calling party requests a collect call. The collect call may be requested from the calling party site 18 or the inmate facility 32.

The following steps 101-114 are performed with respect to the embodiment of FIG. 1 and steps 115-138 are performed with respect to the embodiment of FIG. 2.

In step 101, the central office 12 receives a collect call number from the calling party at the calling party site 18. In step 102, the central office 12 receives a selected number to call or collect call number from the calling party and generates a collect call initiation signal having the collect call number.

In step 104, the central office 12 places an operator call to the receiving party, at a receiving party site 20, in response to the collect call initiation signal. The operator call is routed through the network 16. The central office 12 utilizes operator services from the operator platform 22 in placing the operator call. The terminating office 14 routes the operator call to the receiving party.

In step 105, upon answer of the operator call, the operator platform 22 or the inmate platform 38 prompts the receiving party that a collect call has been requested to the collect called number from the calling party. The operator platform 22 or the inmate platform 38 also prompts the receiving party for collect call options. The receiving party may accept the billing and select standard billing or credit card billing. The collect call may be billed to a party normally billed and associated or not associated with the collect called number. The collect call may be billed to a party that resides at or has a place of business with an address associated or not associated with the collect called number.

In step 106, the operator platform 22 or the inmate platform 38 determines whether the receiving party is agreeable to accepting charges for the collect call. When charges for the collect call is accepted by the receiving party step 108 is performed, otherwise step 114 is performed. In step 108, the receiving party selects the type of billing, as described above.

In step 110, the operator platform 22 or the inmate platform 38 determines whether to approve the billing. The operator platform 22 or the inmate platform 38 may verify billing account status or a credit card number to assure that the receiving party is of adequate standing and the credit card is valid.

In step 112, when the billing has been approved the central office 12 and the terminating office 14 route the collect call. The calling party is connected or provided a communication link to the receiving party in response to the charge acceptance by the receiving party and the billing approval by the operator platform 22.

In step 114, when the receiving party does not accept charges of the collect call or results of the billing approval process are negative, the calling party is not connected to the receiving party. The receiving party may be notified as to the reasons why the results of the billing approval process are negative.

In step 115, the inmate facility receives a collect call number from the calling party. In step 116, the inmate platform 38 receives the collect call number from an inmate and generates an inmate platform query. In step 118, the inmate platform query is received by the LIDB 42 through the central office 34 and the network 40. The LIDB 42 determines status of the called number and generates a status signal.

In step 120, the inmate platform 38 receives and processes the status signal. The inmate platform 38 generates a blocking signal in response to the processing, which includes information regarding such determination. In step 122, when the blocking signal indicates that the called number is blocked the inmate platform 38 places an inmate platform direct call to the receiving party and proceeds to step 124, otherwise the inmate platform 38 places an inmate platform direct call to the receiving party and proceeds to perform step 105.

In step 124, upon answer of the operator call, the inmate platform 38 prompts the receiving party that a collect call has been requested to the collect called number from the calling party. The inmate platform 38 also prompts the receiving party for credit card billing.

In step 126, the inmate platform 38 determines whether the receiving party is agreeable to accepting charges for the collect call. When the charges for the collect call are accepted by the receiving party step 128 is performed, otherwise step 132 is performed.

In step 128, the inmate platform 38 determines whether to approve the billing. The inmate platform 38 verifies a credit card number, received from the receiving party, to assure that the receiving party is of adequate standing and the credit card number is valid.

In step 130, when billing has been approved the central office 34 and the terminating office 36 route the collect call and connect the calling party with the receiving party in response to the charge acceptance by the receiving party and the billing approval by the inmate platform 38.

In step 132, when the receiving party does not accept the billing of the collect call or results of the billing approval process are negative, the calling party is not connected to the receiving party. The receiving party may be notified as to the reasons why the results of the billing validation are negative. For example, the receiving party that answers the operator call or the inmate platform call may not reside in the dwelling associated with the called number or may not have the authority to accept the billing for the collect call. The receiving party may therefore select not to have the collect call billed to the account associated with that dwelling or may select to have the collect call billed to a credit card account. A similar scenario can occur for a place of business or other called communication site.

The calling party at anytime in the above described method may be notified as to whether the collect call has been approved or to any other collect call related information. Also, although the communication service tasks described in the above-stated steps are performed by or are associated with particular communication sites, the tasks may be performed by other communication sites within or external to the system 10.

The above-described steps are meant to be illustrative examples and may be easily modified depending upon the application. The steps may be performed sequentially, synchronously, simultaneously, or in a different order depending upon the application.

The present invention provides an efficient collect call method that aids in assuring that a receiving party has the opportunity to accept a collect call even when selective blocking has been requested from a communication site of a calling party. The present invention also aids in assuring payment for a collect call, especially a collect call that originates from an inmate facility.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   determining, at an inmate platform, a blocking status of a caller-specified phone number associated with a telephone call;
   when the blocking status indicates a non-blocked condition, transferring control of the telephone call from the inmate platform to an operator services platform;
   when the blocking status indicates a blocked condition, dialing the caller-specified phone number from the inmate platform;
   communicating to a receiving party of the telephone call that the telephone call is a collect call;
   offering one or more billing options according to the blocking status, wherein the receiving party of the telephone call is to select one of the one or more billing options to be associated with the collect call;
   determining, via a billing approval process, whether billing associated with the selected billing option is approved or denied; and
   when results of the billing approval process are negative, providing to the receiving party of the telephone call a reason that the results of the billing approval process are negative.

2. The method of claim 1, wherein offering one or more billing options comprises offering the receiving party of the telephone call a first billing option and a second billing option when the blocking status indicates the non-blocked condition, wherein the first billing option comprises supplying a credit account associated with the caller-specified phone number and the second billing option comprises providing a consent to bill the collect call to a credit account that is not associated with the caller-specified phone number.

3. The method of claim 1, wherein offering one or more billing options comprises offering the receiving party of the telephone call a first billing option when the blocking status indicates the non-blocked condition, wherein the first billing option comprises paying for the collect call via a credit card.

4. The method of claim 1, wherein when the blocking status indicates the non-blocked condition, the one or more billing options comprise:
   a standard billing option, the standard billing option including one of:
      an account associated with the caller specified phone number; and
      an account associated with a party that is ordinarily billed for the collect call; and
   a credit card billing option.

5. The method of claim 1, wherein when the blocking status indicates the blocked condition, the one or more billing options comprise a credit card billing option.

6. The method of claim 1, wherein the billing approval process comprises assuring that the receiving party of the telephone call is of adequate standing.

7. The method of claim 6, wherein the receiving party of the telephone call is not of adequate standing when the receiving party of the telephone call does not reside in a dwelling associated with the caller-specified phone number.

8. The method of claim 6, wherein the receiving party of the telephone call is not of adequate standing when the receiving party of the telephone call does not have authority to accept the billing associated with the collect call.

9. The method of claim 1, wherein when the results of the billing approval process are positive, connecting the collect call between a caller and the receiving party of the telephone call and invoking the selected billing option.

10. A system of processing a collect call, the system comprising:
    an input to receive a caller-specified phone number from a caller; and
    a processor coupled to the input, the processor to:
       determine, at an inmate platform, a blocking status of the caller-specified phone number that is associated with a receiving party of a telephone call that is a collect call;
       offer one or more billing options to the receiving party of the telephone call according to the blocking status of the caller-specified phone number, wherein the receiving party of the telephone is to associate one of the one or more billing options with the collect call by selecting the one of the one or more billing options;
       when the blocking status indicates a non-blocked condition, transfer control of the collect call from the inmate platform to an operator services platform to connect the collect call;
       when the blocking status indicates a blocked condition:
          dial the caller-specified phone number from the inmate platform;
          notify a call recipient that the call is a collect call;
          determine, via a billing approval process, whether billing associated with the selected billing option is approved or denied; and
          when results of the billing approval process are negative, notify the receiving party of the telephone call of a reason that the results of the billing approval process are negative.

11. The system of claim 10, wherein selecting the billing option comprises providing credit account information.

12. The system of claim 11, wherein the credit account information is not associated with the caller-specified phone number.

13. The system of claim 10, wherein the processor includes logic to generate a query to a line information database platform to determine the blocking status.

14. The system of claim 10, wherein the caller-specified phone number is associated with an inanimate object.

15. The system of claim 14, wherein the inanimate object comprises a computer.

16. The system of claim 10, wherein the processor is further to connect the collect call between a caller and the receiving party of the telephone call and to invoke the selected billing option when the results of the billing approval process are positive.

17. A computer readable medium including processor-executable instructions that, when executed by a processor, cause the processor to:
    determine, at an inmate platform, a blocking status of a caller-specified phone number;
    when a blocking status of the caller-specified phone number indicates a non-blocked condition, transfer control of the collect call from the inmate platform to an operator services platform to offer one or more billing options to a receiving party of a telephone call to the caller-specified phone number, wherein the receiving party of the telephone call is to associate one of the one or more billing options with a collect call to the caller-specified phone number by selecting the one of the one or more billing options;
    when the blocking status indicates a blocked condition:
       dial the caller-specified phone number from the inmate platform;
       offer a credit card billing option to the receiving party of the telephone call;

determine whether billing associated with the credit card billing option is approved or denied, wherein the determination is made via a billing approval process; and when results of the billing approval process are negative, provide to the receiving party of the telephone call a reason that the results of the billing approval process are negative.

18. The computer readable medium of claim 17, further storing instructions to, when the results of the billing approval process are positive, connect the collect call between a caller and the receiving party of the telephone call and to invoke the selected billing option.

19. The computer readable medium of claim 17, wherein the one or more billing options comprise a standard billing option and a credit card billing option.

20. The computer readable medium of claim 17, wherein the one or more billing options comprise at least one of:

billing to a first party associated with the caller-specified phone number;

billing to a second party not associated with the caller-specified phone number;

billing to a third party that resides at an address associated with caller-specified phone number;

billing to a fourth party that has a place of business with an associated address that is associated with the caller-specified phone number; and billing to a fifth party that has a place of business with an associated address that is not associated with the caller-specified phone number.

\* \* \* \* \*